United States Patent [19]
Copa et al.

[11] 3,828,525
[45] Aug. 13, 1974

[54] WASTE GAS PURIFICATION

[75] Inventors: William M. Copa; Louis A. Pradt, both of Wausau, Wis.

[73] Assignee: Sterling Drug Inc., New York, N.Y.

[22] Filed: Apr. 16, 1973

[21] Appl. No.: 351,233

[52] U.S. Cl............................... 55/68, 55/70, 55/84
[51] Int. Cl............................................. B01d 53/14
[58] Field of Search............ 55/68, 70, 73, 84, 223, 55/228, 229; 210/63

[56] References Cited
UNITED STATES PATENTS
3,359,200   12/1967   Gitchel et al. ........................ 210/63

*Primary Examiner*—Charles N. Hart
*Attorney, Agent, or Firm*—Elmer J. Lawson; Thomas L. Johnson

[57] ABSTRACT

Contaminants and odors are removed from the waste gases emanating from wet air oxidation reactors by passing the gases through an aqueous suspension of activated sewage sludge or the mixed liquor obtained by suspending activated sewage sludge in fresh sewage.

3 Claims, No Drawings

WASTE GAS PURIFICATION

This invention relates to a process for reduction of the organic and inorganic contaminants and elimination of odors from the waste gases emanating from wet air oxidation reactors.

Wet air oxidation is a convenient and efficient way of converting organic waste materials to readily disposable products, and comprises heating the waste materials in the presene of water and an oxygen-containing gas, usually compressed air, at a temperature and elevated pressure such that spontaneous combustion of the organic materials takes place (U.S. Pat. Nos. 2,665,249, 3,060,118, 3,272,740). The exhaust gases issuing from the wet air oxidation reactor, in particular those derived from oxidation of sewage sludge, contain, in addition to carbon dioxide and water vapor, undesirable contaminants such as volatile hydrocarbons and other low molecular weight organic compounds, as well as inorganic substances, especially ammonia. These substances are toxic and impart an unpleasant odor to the waste gases, and it is necessary that a substantial proportion of these contaminants be removed in order to avoid pollution of the atmosphere.

Conventional gas scrubbers containing water are not effective in removing the contaminating substances because of the limited solubility of the latter in water. Solutions of sodium hydroxide and ferric chloride are also ineffective. Aqueous acid removes the ammonia but does not affect the hydrocarbon and other organic components. A buffered solution of potassium permanganate (pH 8.0 in sodium borate) improves odor charactristics and effets a substantial reduction in hydrocarbon content by oxidation, but this method has drawbacks in that insoluble manganese dioxide is precipitated from the solution, and it is necessary to replenish the permanganate as it is used up.

It has now been found that a substantial portion of the contaminants and the objectionable odor can be removed from the gases exiting from sewage sludge wet air oxidation reactors by passing said gases through an aqueous suspension of activated sewage sludge, or the mixed liquor obtained by the addition of activated sludge to fresh sewage. This is a convenient and economical method because of the ready availability of activated sludge in a sewage treatment plant.

The activated sludge used for treatment of wet air oxidation exhaust gases has a total solids content of between about 5,000 and 10,000 mg/l. In the event that a mixed liquor obtained by the addition of activated sludge to fresh sewage is used, the mixed liquor has a suspended solids concentration between about 2,000 and 4,000 mg/l.

The gases emanating from the reactor in which wet air oxidation of sewage sludge occurs contain, when stripped of the water vapor content, about 1,000–12,000 parts per million (ppm) by volume of hydrocarbon measured as methane, of which about 1–15 percent is actual methane. Amounts of oxygenated organic compounds, of the order of 50–80 percent of the measured hydrocarbon concentration including methanol, acetaldehyde, ethanol, acetonitrile, propionaldehyde and acetone, are also present. Ammonia is present in concentration of about 800–1,000 ppm, and carbon monoxide in concentration of about 3,000–5,000 ppm. The remainder of the gases comprises carbon dioxide (about 6–9 percent) and nitrogen and oxygen in about 7:1 ratio.

Passage of the exhaust gases through activated sludge suspension or mixed liquor removes more than 50 percent of the hydrocarbon content, an average of about 60 percent of the oxygenated organic compounds and practically all (over 95 percent) of the ammonia. The actual methane and the carbon monoxide are not affected.

The scrubbing medium, whether activated sludge or mixed liquor, is self regenerated because the oxygenated organic compounds contained in the exhaust gases are readily oxidized by the biological processes that occur in the medium. Because of the biological regeneration, the same volume of activated sludge or mixed liquor can be repeatedly used as the scrubbing medium for a long period of time. In contrast, water alone is ineffective as a srubbing medium because the only mechanism for the removal of the oxygenated compounds is by way of their limited solubility in water.

In operation of the process of the invention, the exhaust gases from wet air oxidation of sewage sludge are first drawn through a vapor trap to remove condensible gases (water, etc.) and an influent sample tube for removal of samples for analysis. The gases then are passed through one or more gas scrubbers (for example, Greenburg-Smith impingers) kept at ambient temperature (20–25°C.), and containing activated sewage sludge or the mixed liquor.

The following examples will illustrate the invention more fully without the latter being limited thereby.

EXAMPLE 1

A sample of gas exiting from a sewage sludge wet air oxidation unit was passed through a vapor trap to remove condensible substances, primarily water vapor, and then analyzed by gas chromatography as follows (in percentage by volume):

| | |
|---|---|
| oxygen | 11.9 |
| nitrogen | 79.6 |
| carbon dioxide | 6.92 |
| carbon monoxide | 0.355 |
| "total" hydrocarbon* | 0.701 |
| methane | 0.119 |

*measured as methane minus actual methane

The gas was then passed at a rate of six liters per minute through two Greenburg-Smith impingers in series, each containing 250 ml. of activated sewage sludge having a total solid content of about 7,500 mg/l. The effluent gas was passed through a vapor trap to remove condensible substances and again analyzed as follows (in percentage by volume):

| | |
|---|---|
| oxygen | 11.9 |
| nitrogen | 79.6 |
| carbon dioxide | 6.83 |
| carbon monoxide | 0.350 |
| "total" hydrocarbon | 0.243 |
| methane | 0.117 |

The reduction in "total" hydrocarbon content was 65.3 percent, and the odor characteristics of the effluent gas were much improved over that of the influent gas. The effluent gas had a fruity fragrance.

EXAMPLE 2

A sample of gas exiting from a sewage sludge wet air oxidation unit was passed through a vapor trap to remove condensible substances, primarily water vapor, and then analyzed as follows (in percentage by volume):

| | |
|---|---|
| oxygen | 12.1 |
| nitrogen | 79.6 |
| carbon dioxide | 7.12 |
| carbon monoxide | 0.355 |
| "total" hydrocarbon | 0.650 |
| methane | 0.114 |

The gas was then passed at a rate of 6 liters per minute through two Greenburg-Smith impingers in series, each containing 250 ml. of mixed liquor derived from addition of activated sludge to fresh sewage, said mixed liquor containing about 3,000 mg/l of suspensed solids. The effluent gas was passed through a vapor trap to remove condensible substances and again analyzed as follows (in percentage by volume):

| | |
|---|---|
| oxygen | 11.9 |
| nitrogen | 79.4 |
| carbon dioxide | 6.87 |
| carbon monoxide | 0.351 |
| "total" hydrocarbon | 0.325 |
| methane | 0.115 |

The reduction in "total" hydrocarbon content was 50 percent, and the odor characteristics of the effluent gas were much improved over that of the influent gas.

EXAMPLE 3.

A sample of gas exiting from a sewage sludge wet air oxidation reactor was reduced to atmospheric pressure and passed through a vapor trap to remove condensible substances, primarily water vapor. The gas, thus stripped of condensate, was passed at a flow-rate of 56.5 cubic feet per hour through a gas scrubber constructed from a 15-foot section of 6-inch pipe charged with fresh activated sludge suspension having a total solids content of about 7,500 mg/l.

The gas before and after scrubbing was analyzed for organic substituents by gas chromatographic methods. The ammonia content was determined by absorption in 10 percent hydrochloric acid and analysis of nitrogen by the Kjeldahl method.

The influent gas was found to contain 31.7 ppm of acetaldehyde, 11.5 ppm of acetonitrile and 181 ppm of acetone. The effluent gas contained no detectable acetaldehyde and only trace amounts (less than 5 percent of that in the influent) of acetonitrile and acetone. The percent of total organics removed was 72.1.

The ammonia content of the influent gas (875 ppm) was reduced to 14.1 ppm after the scrubbing procedure, representing a 98.4 percent reduction. A marked improvement in the odor characteristics of the effluent gas was evident.

Closely similar results were obtained using a 25-day old activated sludge in place of fresh activated sludge.

What is claimed is:

1. A process for removing a substantial portion of the contaminants and objectionable odor from the gases exiting from sewage sludge wet air oxidation reactors, which comprises passing said gases through at least one gas scrubber containing activated sludge or the mixed liquor obtained by adding activated sludge to fresh sewage.

2. A process according to claim 1 in which the scrubber contains activated sludge having a total solids content of between 5,000 and 10,000 mg/l.

3. A process according to claim 1 in which the scrubber contains mixed liquor obtained by adding activated sludge to fresh sewage, said liquor containing suspended solids in concentration between about 2,000 and 4,000 mg/l.

* * * * *